(12) United States Patent
Ferrari et al.

(10) Patent No.: US 7,779,990 B2
(45) Date of Patent: Aug. 24, 2010

(54) TRANSFER DEVICE IN MANUFACTURING SYSTEMS FOR TOBACCO PRODUCTS

(75) Inventors: Michele Ferrari, Ozzano Dell'Emilia (IT); Alessandro Minarelli, Bazzano (IT)

(73) Assignee: G.D S.p.A. (IT)

( * ) Notice: Subject to any disclaimer, the term of this patent is extended or adjusted under 35 U.S.C. 154(b) by 0 days.

(21) Appl. No.: 12/285,904

(22) Filed: Oct. 16, 2008

(65) Prior Publication Data

US 2009/0101479 A1 Apr. 23, 2009

(30) Foreign Application Priority Data

Oct. 17, 2007 (IT) .......................... BO2007A0696

(51) Int. Cl.
 *B65G 17/06* (2006.01)
(52) U.S. Cl. .................................. 198/688.1; 198/852
(58) Field of Classification Search ......... 198/850–853, 198/688.1
 See application file for complete search history.

(56) References Cited

U.S. PATENT DOCUMENTS

| | | | |
|---|---|---|---|
| 3,136,320 A | | 6/1964 | Molins et al. |
| 5,323,893 A | * | 6/1994 | Garbagnati ............... 198/690.2 |
| 5,361,893 A | * | 11/1994 | Lapeyre et al. ............... 198/853 |
| 5,490,589 A | | 2/1996 | Golz et al. |
| 5,507,383 A | * | 4/1996 | Lapeyre et al. ............... 198/853 |
| 6,948,613 B2 | * | 9/2005 | Guldenfels et al. ........... 198/853 |

OTHER PUBLICATIONS

European Search Report dated Feb. 16, 2009 from counterpart European patent application No. 08 166 099.5.

* cited by examiner

*Primary Examiner*—Mark A Deuble
(74) *Attorney, Agent, or Firm*—Timothy J. Klima; Shuttleworth & Ingersoll, PLC

(57) ABSTRACT

In a manufacturing system for tobacco products, a cigarette maker and a cigarette packer are linked by a transfer device consisting in a flat top chain conveyor that comprises a plurality of modular molded plastic elements connected one to the next by way of hinge elements and fashioned with respective tops combining to create a transport surface on which a layer of cigarettes advances en masse from one machine to the other; the flat tops of the single modular elements present a soft outer layer having a high coefficient of friction, which is co-molded with the relative modular element.

2 Claims, 2 Drawing Sheets

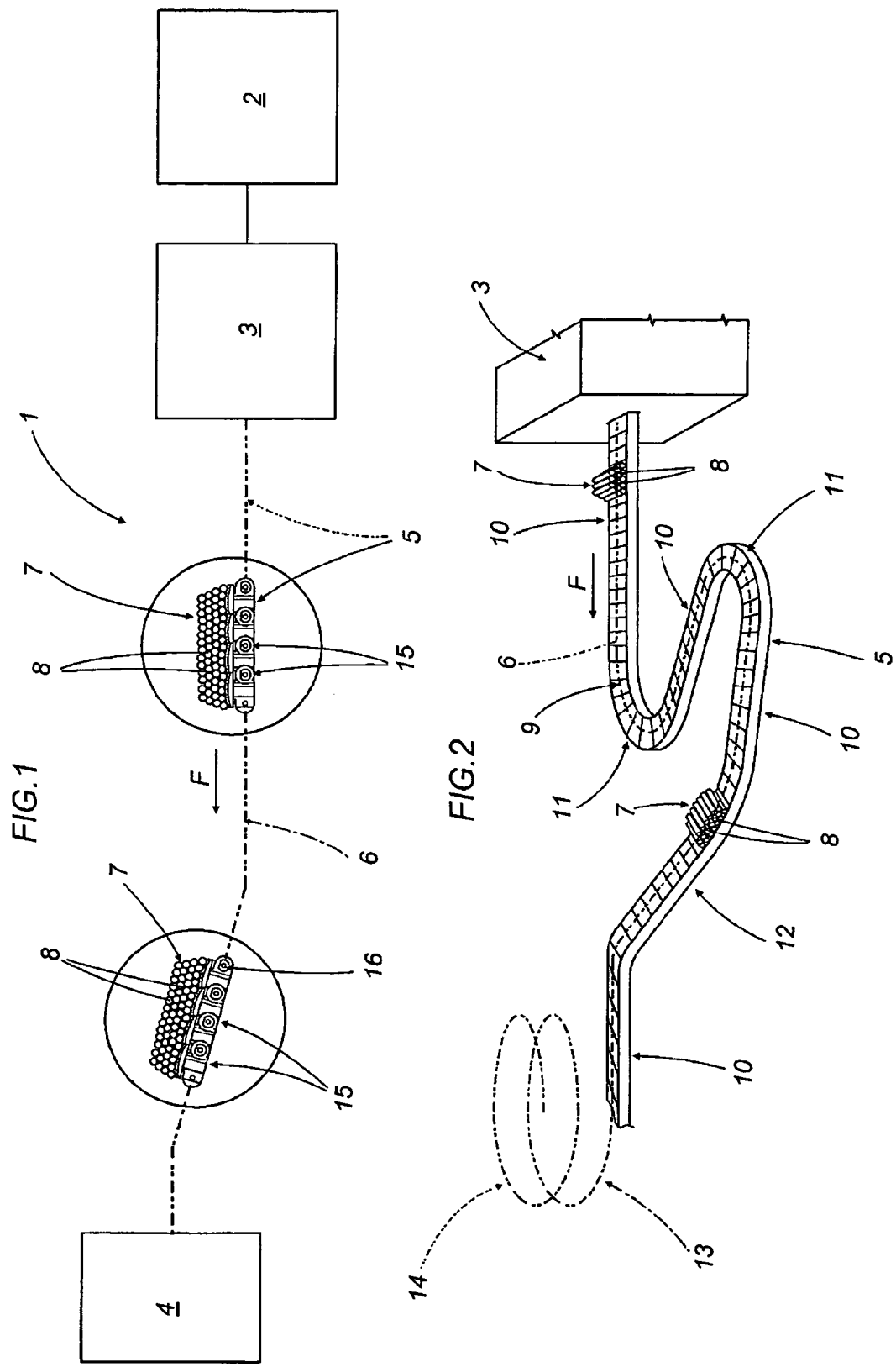

TRANSFER DEVICE IN MANUFACTURING SYSTEMS FOR TOBACCO PRODUCTS

BACKGROUND OF THE INVENTION

The present invention relates to a transfer device in manufacturing systems for tobacco products.

In the art field of manufacturing and packing systems as used in the tobacco industry, it is common practice for tobacco products, and in particular cigarettes, to which reference is made by way of example in the following specification, to be transferred en masse utilizing belt or chain type conveyors.

The purpose of such an operation is to take up cigarettes from a first machine of the system, a cigarette maker for example, and feed them continuously in a loosely arranged but ordered flow to a second machine of the system such as a packer, by which the cigarettes are wrapped in groups.

The cigarettes making up the ordered flow are disposed transversely to the conveying direction, lying one on top of another, en masse, in such a way as to form a layer of substantially constant depth.

It is common practice likewise for the transferred cigarettes to be conveyed along paths typically including straight, inclined and curved stretches.

It will often be the case that a buffer storage unit is located between the maker and the packer, to compensate for differences in their rates of output. In this instance, the cigarettes are conveyed along a spiral path for a certain distance.

Conventional conveying systems comprise a plurality of modular elements fashioned from rigid plastic material, connected one to the next by hinge means in such a way as to form a continuous and flexible chain loop passing around guide and support rollers.

The single modular elements, produced by a molding operation, are fashioned with a flat top serving as a transport surface, and a body molded integrally with the flat top, which is connected to the modular elements on either side by way of the aforementioned hinge means.

The flat tops of the elements combine to create a substantially continuous surface on which the layer of cigarettes is supported and transferred.

In prior art embodiments, to ensure the cigarettes grip the conveyor firmly and consequently prevent any possibility that the advancing layer of cigarettes could slip during the course of the transfer, especially on the curved and inclined stretches, a relatively soft facing material is applied to the transport surface of each modular element, by means of an adhesive, such as will increase the friction coefficient of the conveying surface.

In practice, it has been found that with the system in operation, fragments of the aforementioned high friction facing material can be caused by a combination of mechanical stresses and wear to break off, whereupon these same fragments are able to reach the packer quite easily and find their way together with the groups of cigarettes into the single packets.

If packets containing this foreign matter are not immediately detected and discarded, they will be distributed and retailed, with the result that the manufacturer must obviously suffer damage through loss of image.

The object of the present invention is to provide a conveyor device for tobacco products that will be unaffected by the drawbacks described above with reference to the prior art.

SUMMARY OF THE INVENTION

The stated object is realized according to the present invention in a transfer device for tobacco products, comprising a chain conveyor such as will transport a continuous and substantially uniform layer of products en masse from one machine of a manufacturing system to another.

The conveyor consists in a plurality of modular elements connected one to the next by hinge means and presenting respective flat tops that combine to create a transport surface carrying the products; to advantage, each top presents a soft outer layer having a high coefficient of friction, co-molded with the relative modular element.

BRIEF DESCRIPTION OF THE DRAWINGS

The invention will now be described in detail, by way of example, with the aid of the accompanying drawings, in which:

FIG. 1 is a schematic illustration of a system for manufacturing tobacco products, comprising a conveyor embodied in accordance with the present invention;

FIG. 2 shows the conveyor of FIG. 1, viewed in perspective;

DESCRIPTION OF THE PREFERRED EMBODIMENTS

Figure 3:
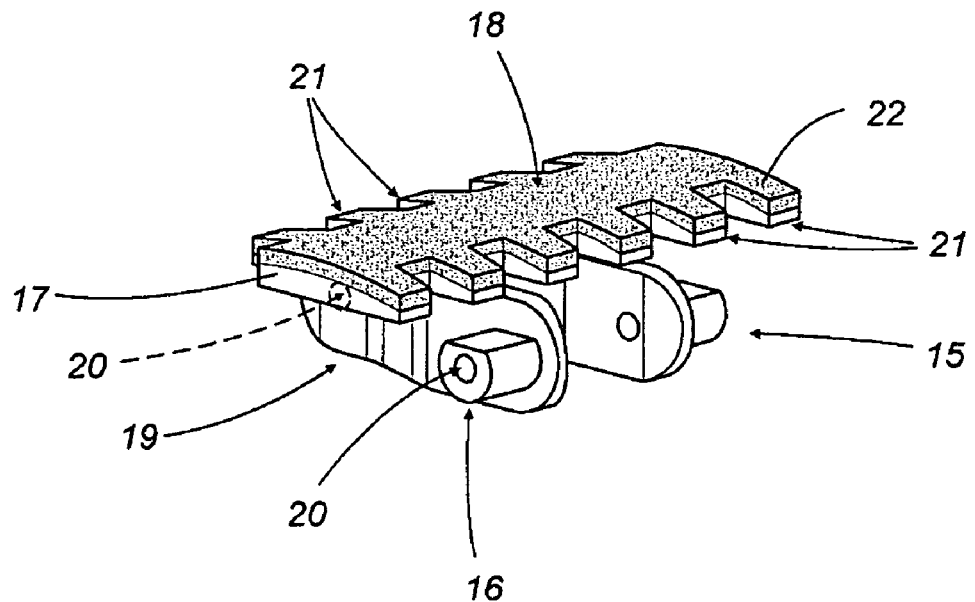
FIG. 3 shows an enlarged detail of the conveyor in FIG. 2.

With reference to FIG. 1, numeral 1 denotes a system for manufacturing tobacco products, in its entirety, comprising a cigarette maker 2 and a filter tip attachment machine 3 connected directly one to another, also a cigarette packer 4 connected to the filter tip attachment machine by way of a transfer device embodied, in accordance with the present invention, as a chain conveyor 5.

The tobacco products, consisting of filter-tipped cigarettes, are directed by the conveyor 5 along a feed path 6 in a direction denoted F (see arrow), advancing as a continuous layer 7 of substantially constant depth with the single cigarettes 8 disposed transversely to the feed direction F.

Referring also to FIGS. 2 and 3, the conveyor 5 presents a transport surface denoted 9 and extends between the filter tip attachment machine 3 and the cigarette packer 4 along the aforementioned path 6, which in the example of FIG. 2 comprises straight segments 10, curved segments 11 centered on vertical axes orthogonal to the path 6, an inclined segment denoted 12, and a spiral segment denoted 13 that functions as an in-line storage unit or buffer 14 of variable volume, conventional in embodiment.

The conveyor 5 comprises a plurality of modular elements 15, fashioned from plastic material by means of a molding process and connected one to the next by way of hinge means 16.

Each modular element 15 comprises a flat top 17, establishing an outer surface or transport surface 18 having a high coefficient of friction, also a body 19 integral with the flat top 17 and connectable on either side to the bodies 19 of two adjoining modular elements 15 by way of respective pivots 20 disposed transversely to the feed direction F and providing the aforementioned hinge means 16.

The flat top 17 of the single modular element is substantially rectangular in outline and fashioned with toothed profiles 21 along two longitudinal sides disposed transversely to the feed direction F, designed to interlock freely, allowing a given degree of clearance, with the toothed profiles 21 of the adjoining modular elements 15.

Thus, the high friction transport surfaces 18 of the single modular elements 15 combine to create the aforementioned substantially continuous surface 9 on which the continuous layer 7 of cigarettes 8 is supported and transferred along the various segments 10, 11, 12 and 13 of the feed path 6.

Figure 4:
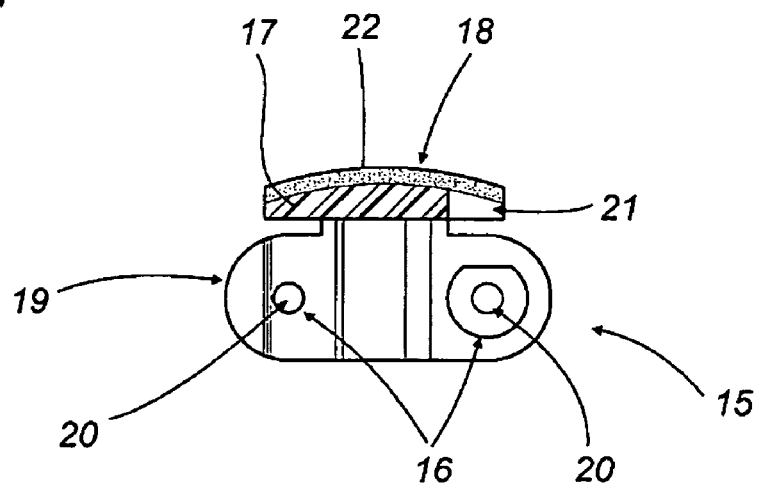
FIG. 4 shows the detail of FIG. 3, illustrated in section.

As illustrated to advantage in FIG. 4, the substantially flat top 17 comprises a layer 22 of predetermined thickness (2-3 mm, for example) affording the transport surface 18.

The modular element 15 of plastic material and the transport layer 22, fashioned from a soft material having a high coefficient of friction, are produced by a co-molding process of a type familiar to persons skilled in the art.

The process in question includes a first step of molding the modular element 15, employing a mold equipped with a movable wall on the side coinciding with the transport surface 18.

As the plastic material cools, the movable wall is distanced by parallel translation through 2-3 mm, creating a space into which a second type of plastic material can be injected, in this instance one with a high coefficient of friction destined to form the aforementioned layer 22.

Self-evidently, unlike the facing affixed with adhesive in prior art solutions, the layer 22 obtained with the co-molding method described above forms an integral part of the flat top 17.

Accordingly, there is no possibility whatever that fragments of plastic material can become detached from the conveyor 5.

What is claimed is:

1. A method of molding a modular element for conveyor of a manufacturing system for tobacco products, comprising:
    molding a body, connectable to adjoining modular elements, by injecting a plastic material into a mold having a movable wall forming a top side of the body,
    creating a co-molding space above the top side of the body by distancing the movable wall from the body with a parallel translation,
    injecting a second material into the co-molding space to co-mold a transport surface onto the top side of the molded body for engaging and transporting the tobacco products, wherein the second material is softer than the plastic material from which the body is molded and has a coefficient of friction both higher than the plastic material and sufficiently high to grip the tobacco products on the conveyor and prevent the tobacco products from slipping on the conveyor during transporting of the tobacco products.

2. The method of claim 1, and further comprising distancing the movable wall away from the body by between 2-3 mm to co-mold a transport surface having a thickness of between 2-3 mm.

* * * * *